(12) United States Patent
Chistov et al.

(10) Patent No.: US 12,337,767 B2
(45) Date of Patent: Jun. 24, 2025

(54) VEHICLE HEADLAMP

(71) Applicant: ZKW Group GmbH, Wieselburg (AT)

(72) Inventors: Oleksandr Chistov, Wieselburg (AT); Martin Brandstetter, Ybbs (AT)

(73) Assignee: ZKW Group GmbH, Wieselburg (AT)

( * ) Notice: Subject to any disclaimer, the term of this patent is extended or adjusted under 35 U.S.C. 154(b) by 268 days.

(21) Appl. No.: 18/080,920

(22) Filed: Dec. 14, 2022

(65) Prior Publication Data
US 2023/0182655 A1    Jun. 15, 2023

(30) Foreign Application Priority Data

Dec. 15, 2021    (EP) ..................................... 21214785

(51) Int. Cl.
*H01L 29/94*        (2006.01)
*B60Q 1/24*         (2006.01)
(Continued)

(52) U.S. Cl.
CPC .............. *B60R 11/04* (2013.01); *B60Q 1/249* (2022.05); *B60W 30/08* (2013.01); *F21S 41/285* (2018.01);
(Continued)

(58) Field of Classification Search
CPC ............. B60R 11/04; B60R 2300/8093; B60R 2300/402; B60R 1/23; B60Q 1/249;
(Continued)

(56) References Cited

U.S. PATENT DOCUMENTS 5,850,254 A  *  12/1998  Takano ................ G05D 1/0246
                                                              382/104
10,369,923 B1 *  8/2019  Chen ...................... H05B 47/10
(Continued)

FOREIGN PATENT DOCUMENTS

| DE | 102006056180 A1 | 4/2008 |
| DE | 102015116920 A1 | 4/2017 |
| DE | 102019108056 A1 | 10/2020 |

OTHER PUBLICATIONS

Search Report for European Patent Application No. 21214785.4 dated May 17, 2022 (8 pages).

*Primary Examiner* — Joseph Suh
(74) *Attorney, Agent, or Firm* — Eversheds Sutherland (US) LLP

(57) ABSTRACT

A vehicle headlamp includes: (i) a housing and cover lens, (ii) an obstacle detection device including a camera, for capturing images, and (iii) a camera calibration system for automatically calibrating the spatial orientation of the camera. The system keeps the camera in a predetermined target position and includes (a) an adjustment device for adjusting the spatial orientation of the camera within the housing, (b) a reference mark arranged in the housing, and (c) a control device. Each image has a constant predetermined reference mark position sector (PRMPS), and the camera is in the target position when the reference mark is arranged within the PRMPS of the images. The control device receives the images captured by the camera and controls the adjustment device to remove the deviation from the target position when the reference mark is outside the PRMPS of the images in a non-target position.

11 Claims, 2 Drawing Sheets

(51) Int. Cl.
| | |
|---|---|
| *B60R 11/04* | (2006.01) |
| *B60W 30/08* | (2012.01) |
| *F21S 41/20* | (2018.01) |
| *G06T 7/73* | (2017.01) |
| *G06T 7/80* | (2017.01) |
| *G06V 20/58* | (2022.01) |

(52) U.S. Cl.
CPC ............... *G06T 7/73* (2017.01); *G06T 7/85* (2017.01); *G06V 20/58* (2022.01); *B60R 2300/8093* (2013.01); *B60W 2420/403* (2013.01)

(58) Field of Classification Search
CPC ........ B60Q 1/0023; B60Q 1/04; B60Q 1/076; B60Q 1/08; B60Q 2200/30; B60W 30/08; B60W 2420/403; F21S 41/285; F21S 41/00; F21S 41/25; G06T 7/73; G06T 7/85; G06V 20/58; H04N 23/57; H04N 23/695; H04N 17/002; H04N 23/61; F21V 5/04; F21V 33/0052; G03B 13/00; G03B 17/00; G03B 17/48; G03B 17/56; G03B 2205/00; G03B 2213/00; G03B 2217/00; F21W 2102/00; F21W 2107/10
See application file for complete search history.

(56) References Cited

U.S. PATENT DOCUMENTS

| | | | | |
|---|---|---|---|---|
| 2001/0054989 | A1* | 12/2001 | Zavracky | G02B 27/017 345/8 |
| 2003/0144813 | A1* | 7/2003 | Takemoto | G06T 7/80 702/153 |
| 2005/0219361 | A1* | 10/2005 | Aoki | H04N 7/188 348/E7.086 |
| 2006/0236586 | A1* | 10/2006 | Zaderey | F41G 1/38 42/133 |
| 2010/0047000 | A1* | 2/2010 | Park | G03G 15/5062 399/394 |
| 2012/0314073 | A1* | 12/2012 | Shimoda | G06T 7/80 348/148 |
| 2014/0300693 | A1* | 10/2014 | Hirata | G03B 37/02 348/39 |
| 2016/0119532 | A1* | 4/2016 | Chen | H04N 23/90 348/211.2 |
| 2017/0129389 | A1 | 5/2017 | Asaoka et al. | |
| 2017/0225891 | A1* | 8/2017 | Elazary | G05D 1/0234 |
| 2018/0059665 | A1* | 3/2018 | Shin | H04N 23/6812 |
| 2018/0170240 | A1* | 6/2018 | Wama | B60Q 1/0023 |
| 2020/0376831 | A1* | 12/2020 | Tatsuda | B41J 2/2135 |
| 2022/0030212 | A1* | 1/2022 | Aggarwal | H04N 13/246 |
| 2022/0084246 | A1* | 3/2022 | Dai | G06T 3/60 |
| 2023/0064953 | A1* | 3/2023 | Iwai | G06V 20/52 |

\* cited by examiner

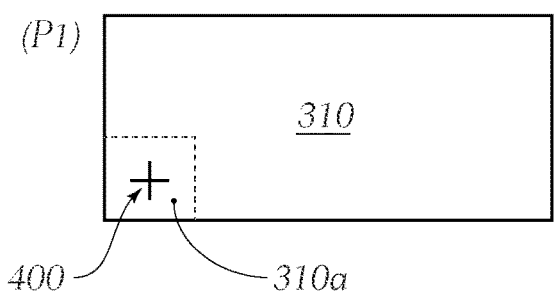
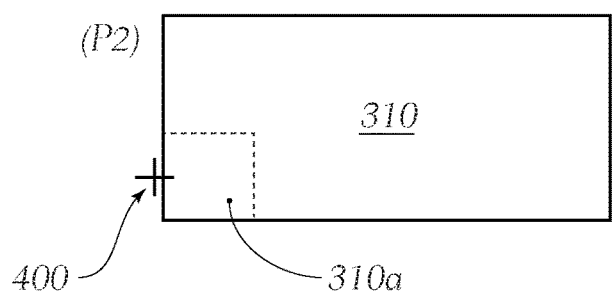
Fig. 4          Fig. 5
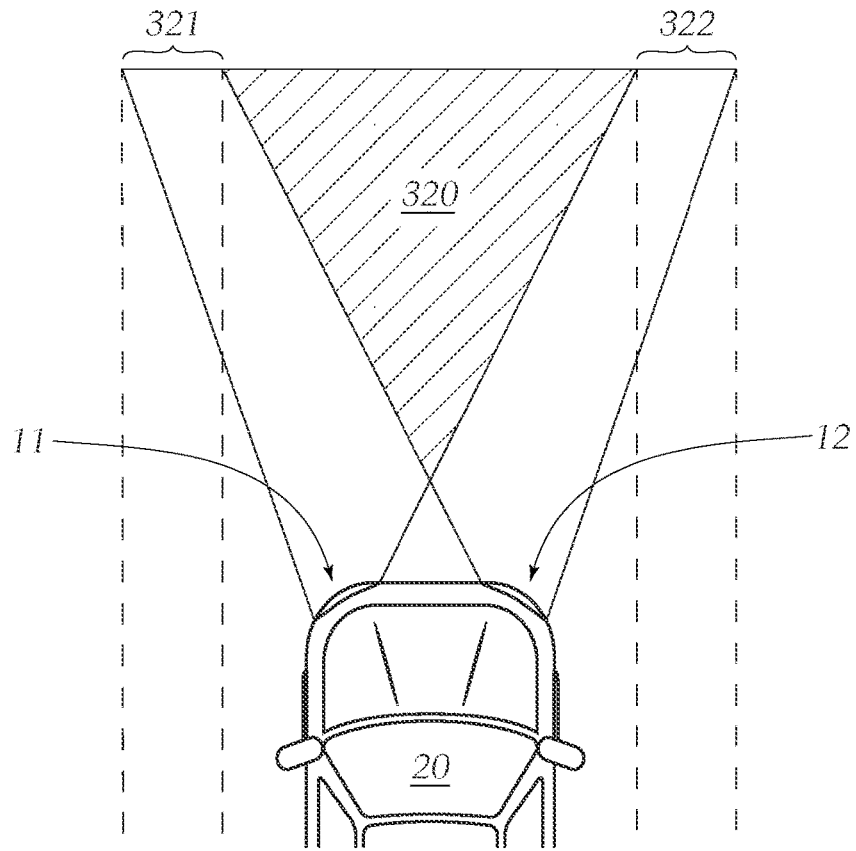
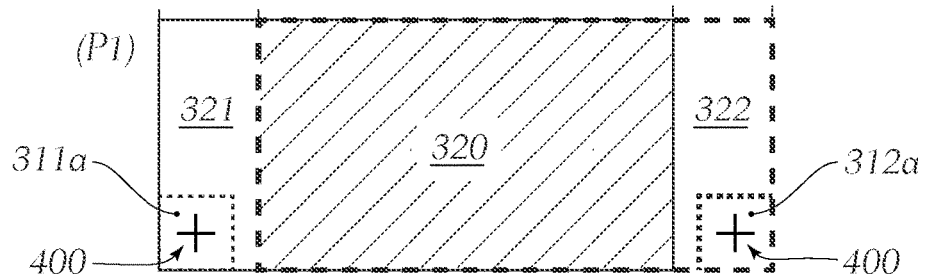
Fig. 6

VEHICLE HEADLAMP

CROSS-REFERENCE TO RELATED APPLICATIONS

This application claims priority to European Patent Application No. 212147785.4, filed Dec. 15, 2021, which is incorporated herein by reference.

FIELD OF THE INVENTION AND DESCRIPTION OF PRIOR ART

The invention relates to a vehicle headlamp for illuminating a light distribution and for detecting an obstacle in front of the vehicle headlamp in a main direction.

The invention also relates to a vehicle headlamp system comprising two vehicle headlamps according to the invention for detecting an obstacle in front of the vehicle headlamp system.

The invention also relates to a vehicle comprising at least one vehicle headlamp and/or at least one vehicle headlamp system according to the invention.

In the state of the art, calibration of a camera inside a vehicle headlamp can drift away due to vibrations, tolerances of components or algorithms. Calibration is usually performed by algorithms and/or reference to a known pattern in front of the system.

But since during the runtime, no fixed reference points are provided, the calibration tends to drift away. Using software algorithms help to reduce the performance loss, however, the drift must be within an acceptable area to compensate.

SUMMARY OF THE INVENTION

It is an object of the invention to provide an enhanced vehicle headlamp.

To achieve this object, the vehicle headlamp comprises
- a housing with a front opening directed in the main direction and a cover lens closing the opening of the housing,
- an obstacle detection device comprising a camera for capturing images of the environment in front of the camera in the main direction in order to detect obstacles in front of the vehicle headlamp, wherein the camera is disposed inside the housing,
- a camera calibration system for automatically calibrating the spatial orientation of the camera, wherein the camera calibration system is configured to keep the camera in a predetermined target position, wherein the camera calibration system comprises:
  - an adjustment device for adjusting the spatial orientation of the camera within the housing,
  - a reference mark non movable in relation to the housing and arranged in an image producing field of view of the camera in the housing, so that the reference mark is visible in the images by the camera, wherein each image having a constant predetermined reference mark position sector, and wherein the camera is in the target position, when the reference mark is arranged within the predetermined reference mark position sector of the images,
  - a control device which is connected to the camera and the adjustment device, wherein the control device is configured to receive the images captured by the camera, wherein the control device controls the adjustment device in order to remove the deviation from the target position the camera, when the reference mark is outside the predetermined reference mark position sector of the images in a non-target position.

Advantageously, the reference mark is arranged on the cover lens, preferably a part of the cover lens.

Advantageously, the vehicle headlamp comprises a lens or a lens system arranged between the reference mark and the camera in order to create a sharp image of the reference mark.

Advantageously, the lens or lens system is part of the cover lens, preferably an integral part of the cover lens.

Advantageously, the reference mark is realized on the cover lens as a black material via a two-component molding process of the cover lens.

Advantageously, the reference mark is built as a cross comprising a horizontal line and a vertical line in order to be able to align the horizontal line in a x-direction and the vertical line in a y-direction—seen in a correctly installed state of the vehicle headlamp in a vehicle.

Advantageously, the reference mark is arranged on an additional bezel in the housing.

The object can also be achieved by a vehicle headlamp system comprising two vehicle headlamps according to the invention for detecting an obstacle in front of the vehicle headlamp system, wherein the vehicle headlamp system comprises a further control device which is connected to the cameras, the control devices and the adjustment devices of the vehicle headlamps, wherein the further control device is configured to receive captured images of both vehicle headlamps, and wherein the further control device by means of a program stored in the further control device is configured to align the cameras via the adjustment devices with respect to each other in such a way that, when images captured by the cameras at the same time are overlapped by the program, the images substantially overlap with respect to the horizon and/or a roadside in the images, wherein the camera calibration systems of each vehicle headlamp brings the cameras in the target position in case the further control device align the cameras in a way that the cameras are in the non-target position.

The object can also be achieved by a vehicle comprising at least one vehicle headlamp and/or at least one vehicle headlamp system according to the invention.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

Figure 1:
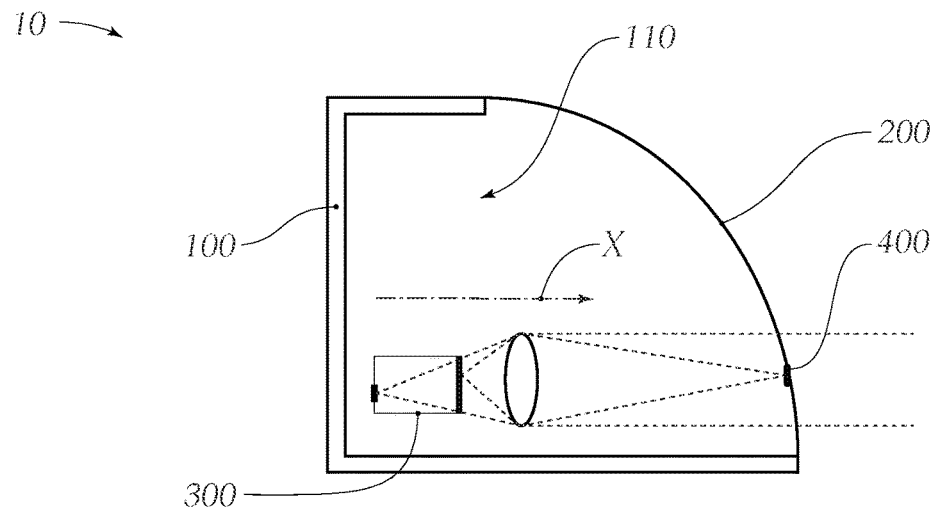
FIG. 1 a schematic cross section of an exemplary vehicle headlamp, comprising a housing with a front opening, and a cover lens closing the opening of the housing, wherein the vehicle headlamp comprises a camera and a camera calibration system, wherein the camera calibration system comprises a reference mark, which is arrange on the cover lens, and wherein the camera calibration system is configured to adjust the camera automatically in a target position, wherein the reference mark is in a reference mark position sector of a captured image in the target position, FIG. 2 a schematic cross section of the vehicle headlamp of FIG. 1, with the difference that a lens is arranged in front of the reference mark, wherein the lens is part of the cover lens, FIG. 3 a detailed side view of a part of the cover lens with the reference mark and corresponding lens, FIG. 4 a captured image of the camera, wherein the reference mark is in the reference mark position sector, thus the camera is in the target position, FIG. 5 a captured image of the camera, wherein the reference mark is not completely in the reference mark position sector, thus the camera is in a non-target position, and FIG. 6 a schematic overview of a vehicle comprising a vehicle headlamp system consisting of vehicle headlamps according to an embodiment of FIG. 1 or FIG. 2.

FIG. 1 shows an example of a vehicle headlamp 10 for illuminating a light distribution and for detecting an obstacle in front of the vehicle headlamp 10 in a main direction X, wherein the vehicle headlamp 10 comprises a housing 100 with a front opening 110 directed in the main direction X and a cover lens 200 closing the opening 110 of the housing 100.

Further, the vehicle headlamp 10 comprises an obstacle detection device comprising a camera 300 for capturing images 310 of the environment in front of the camera 300 in the main direction X in order to detect obstacles in front of the vehicle headlamp 10, wherein the camera 300 is disposed inside the housing 100.

The vehicle headlamp 10 also comprises a camera calibration system for automatically calibrating the spatial orientation of the camera 300, wherein the camera calibration system is configured to keep the camera 300 in a predetermined target position P1.

The camera calibration system comprises an adjustment device for adjusting the spatial orientation of the camera 300 within the housing 100, and a reference mark 400 non movable in relation to the housing 100 and arranged in an image producing field of view of the camera 300 in the housing 100, so that the reference mark 400 is visible in the images 310 captured by the camera 300, wherein each image 310 having a constant predetermined reference mark position sector 310a, and wherein the camera 300 is in the target position P1, when the reference mark 400 is arranged within the predetermined reference mark position sector 310a of the images 310, as can be seen for example in FIG. 4.

Figure 2:
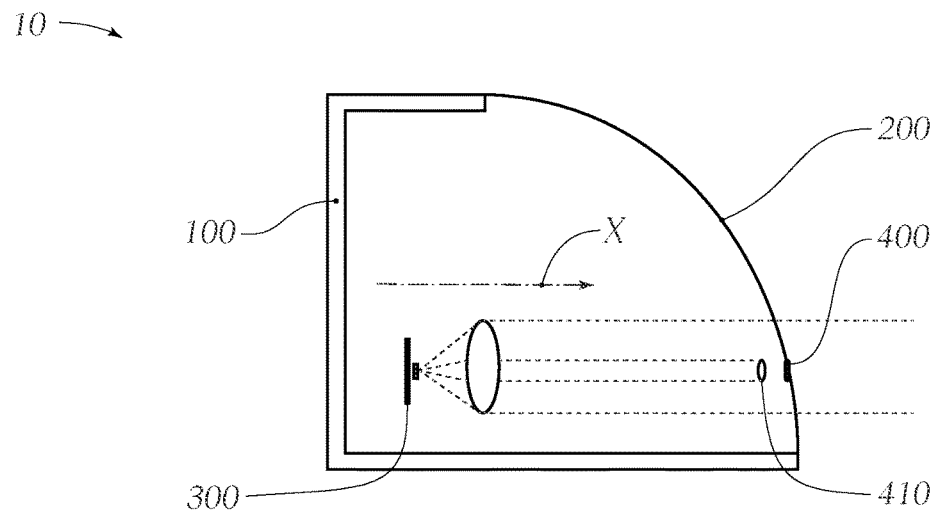
Figure 3:
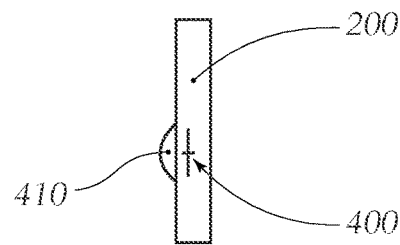

In the embodiments in FIG. 1 and FIG. 2, the reference mark 400 is arranged on the cover lens 200, preferably is a part of the cover lens 200.

Further, the camera calibration system comprises a control device which is connected to the camera 300 and the adjustment device, wherein the control device is configured to receive the images 310 captured by the camera 300, wherein the control device controls the adjustment device in order to remove the deviation from the target position P1 the camera 300, when the reference mark 400 is outside the predetermined reference mark position sector 310a of the images 300 in a non-target position P2, which non-target position P2 can be seen for example in FIG. 5.

In the embodiment in FIG. 2, which is almost identical to the embodiment in FIG. 1, the vehicle headlamp 10 comprises a lens 410 arranged between the reference mark 400 and the camera 300 in order to create a sharp image of the reference mark 400, wherein the lens 410 is part of the cover lens 200, preferably an integral part of the cover lens 200.

In both embodiments, the reference mark 400 is realized on the cover lens 200 as a black material via a two-component molding process of the cover lens 200, wherein the reference mark 400 is built as a cross comprising a horizontal line and a vertical line in order to be able to align the horizontal line in a x-direction and the vertical line in a y-direction—seen in a correctly installed state of the vehicle headlamp 10 in a vehicle (the x-direction corresponds to a horizontal line and the y-direction to a vertical line orthogonal to the horizontal line).

FIG. 6 shows a vehicle headlamp system comprising two vehicle headlamps 10 according to the invention, and for detecting an obstacle in front of the vehicle headlamp system, wherein a first vehicle headlamp 11 is a left vehicle headlamp of the shown vehicle 20, and a second vehicle headlamp 12 is right vehicle headlamp of the shown vehicle 20 in FIG. 6.

The camera of the first vehicle headlamp 11 captures images 311 and the camera of the second vehicle headlamp 12 captures images 312, wherein the vehicle headlamp system comprises a further control device which is connected to the cameras 300, the control devices and the adjustment devices of the vehicle headlamps 11, 12.

The further control device is configured to receive captured images 311, 312 of both vehicle headlamps 11, 12, which vehicle headlamps 11, 12 are spaced apart, so that the cameras of the vehicle headlamps 11, 12 having a distance between each other for distance measuring of an obstacle in front of the vehicle headlamp system to the vehicle headlamp system, i.e. triangulation, wherein the further control device by means of a program stored in the further control device is configured to align the cameras 300 via the adjustment devices with respect to each other in such a way that, when images 311, 312 captured by the cameras 300 at the same time are overlapped by the program, the images 311, 312 substantially overlap with respect to the horizon and/or a roadside in the images 311, 312, wherein the camera calibration systems of each vehicle headlamp 11, 12 brings the cameras 300 in the target position P1 in case the further control device align the cameras 300 in a way that the cameras 300 are in the non-target position P2.

For reference, the image 312 of the second vehicle headlamp 12 is viewed with thick dotted lines in FIG. 6.

When overlapping for distance measuring, i.e. by triangulation, the captured images 311, 312 overlap only in an overlap-area 320 of each image 311, 312, so that each image 311, 312 comprises an overlap-area 320 and a non-overlap area 321, 322, wherein the reference mark position section 311a, 312a of each image 311, 312 is positioned in the non-overlap area 311a, 312a, so that the reference mark corresponding to one camera cannot be captured in an image of the other camera.

| LIST OF REFERENCE SIGNS | |
| --- | --- |
| Vehicle headlamp | 10 |
| Vehicle headlamp (right side) | 11 |
| Vehicle headlamp (left side) | 12 |
| Housing | 100 |
| Front opening | 110 |
| Cover lens | 200 |
| Camera | 300 |
| Images | 310, 311, 312 |
| Reference mark position sector | 310a, 311a, 312a |
| Image overlapping area | 320 |
| Image non-overlapping area | 321, 322 |
| Reference mark | 400 |
| Lens | 410 |
| Target position | P1 |
| Non-target position | P2 |
| Main direction | X |

The invention claimed is:

1. A vehicle headlamp system comprising:

two vehicle headlamps (10, 11, 12) for detecting an obstacle in front of the vehicle headlamp system, wherein each of the two vehicle headlamps is a vehicle headlamp (10) for illuminating a light distribution and for detecting an obstacle in front of the vehicle headlamp (10) in a main direction (X), comprising:

a housing (100) with a front opening (110) directed in the main direction (X) and a cover lens (200) closing the opening (110) of the housing (100);

an obstacle detection device comprising a camera (300) for capturing images (310) of the environment in front of the camera (300) in the main direction (X) in order to detect obstacles in front of the vehicle headlamp (10), wherein the camera (300) is disposed inside the housing (100); and a camera calibration system for automatically calibrating the spatial orientation of the camera (300), wherein the camera calibration system is configured to keep the camera (300) in a predetermined target position (P1), wherein the camera calibration system comprises:

an adjustment device for adjusting the spatial orientation of the camera (300) within the housing (100), a reference mark (400) non movable in relation to the housing (100) and arranged in an image producing field of view of the camera (300) in the housing (100), so that the reference mark (400) is visible in the images (310) by the camera (300), wherein each image (310) having a constant predetermined reference mark position sector (310a), and wherein the camera (300) is in the target position (P1), when the reference mark (400) is arranged within the predetermined reference mark position sector (310a) of the images (310), and a control device which is connected to the camera (300) and the adjustment device, wherein the control device is configured to receive the images (310) captured by the camera (300), wherein the control device controls the adjustment device in order to remove the deviation from the target position (P1) of the camera (300), when the reference mark (400) is outside the predetermined reference mark position sector (310a) of the images (300) in a non-target position (P2); and a further control device which is connected to the cameras (300), the control devices and the adjustment devices of the vehicle headlamps (10), wherein the further control device is configured to receive captured images (310) of both vehicle headlamps (10), and wherein the further control device by means of a program stored in the further control device is configured to align the cameras (300) via the adjustment devices with respect to each other in such a way that, when images (310) captured by the cameras (300) at the same time are overlapped by the program, the images (310) substantially overlap with respect to the horizon and/or a roadside in the images (310), wherein the camera calibration system of each vehicle headlamp (10) brings the cameras (300) in the target position (P1) in case the further control device align the cameras (300) in a way that the cameras (300) are in the non-target position (P2).

2. The vehicle headlamp system according to claim 1, wherein the reference mark (400) is arranged on the cover lens (200).

3. The vehicle headlamp system according to claim 2, wherein the reference mark (400) is a part of the cover lens (200).

4. The vehicle headlamp system according to claim 1, wherein the vehicle headlamp (10) comprises a lens (410) or a lens system arranged between the reference mark (400) and the camera (300) in order to create a sharp image of the reference mark (400).

5. The vehicle headlamp system according to claim 4, wherein the lens (410) or lens system is part of the cover lens (200).

6. The vehicle headlamp system according to claim 5, wherein the lens (410) or lens system is an integral part of the cover lens (200).

7. The vehicle headlamp system according to claim 1, wherein the reference mark (400) is realized on the cover lens (200) as a black material via a two-component molding process of the cover lens (200).

8. The vehicle headlamp system according to claim 1, wherein the reference mark (400) is built as a cross comprising a horizontal line and a vertical line in order to be able to align the horizontal line in a x-direction and the vertical line in a y-direction—seen in a correctly installed state of the vehicle headlamp (10) in a vehicle.

9. The vehicle headlamp system according to claim 1, wherein the reference mark (400) is arranged on an additional bezel in the housing (200).

10. The vehicle headlamp system according to claim 1, wherein the vehicle headlamps (10) are spaced apart, so that the cameras of the vehicle headlamps (10, 11, 12) having a distance between each other for distance measuring of an obstacle in front of the vehicle headlamp system to the vehicle headlamp system, wherein for distance measuring the images (311, 312) overlap only in an overlap-area (320) of each image (311, 312), so that each image (311, 312) comprises an overlap-area (320) and a non-overlap area (321, 322), wherein the reference mark position section (311a, 312a) of each image (311, 312) is positioned in the non-overlap area (311a, 312a).

11. A vehicle comprising at least one vehicle headlamp system according to claim 1.

* * * * *